US012311380B2

(12) United States Patent
Voigt et al.

(10) Patent No.: US 12,311,380 B2
(45) Date of Patent: May 27, 2025

(54) RECIRCULATING CRUSHING PLANT

(71) Applicant: Superior Industries, Inc., Morris, MN (US)

(72) Inventors: Matt Voigt, Morris, MN (US); Matt Esson, Morris, MN (US); Robert Taylor, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 107 days.

(21) Appl. No.: 17/452,916

(22) Filed: Oct. 29, 2021

(65) Prior Publication Data

US 2022/0134349 A1 May 5, 2022

Related U.S. Application Data

(60) Provisional application No. 63/107,421, filed on Oct. 29, 2020.

(51) Int. Cl.

*B02C 23/12* (2006.01)
*B02C 13/02* (2006.01)
*B02C 21/02* (2006.01)
*B02C 23/02* (2006.01)

(52) U.S. Cl.

CPC .............. *B02C 23/12* (2013.01); *B02C 21/02* (2013.01); *B02C 23/02* (2013.01); *B02C 13/02* (2013.01)

(58) Field of Classification Search

CPC ....... B02C 23/12; B02C 21/02; B02C 21/026; B02C 13/04; B02C 13/06; B65G 41/002; B65G 41/005

USPC ........................................................... 241/80

See application file for complete search history.

(56) References Cited

U.S. PATENT DOCUMENTS

| | | | | |
|---|---|---|---|---|
| 4,598,875 A | | 7/1986 | Chalmers | |
| 4,795,103 A | * | 1/1989 | Lech | B02C 13/04 241/101.76 |
| 5,647,545 A | | 7/1997 | Conner | |
| 5,655,719 A | | 8/1997 | Getz | |
| 2015/0122920 A1 | * | 5/2015 | Dallimore | B02C 13/095 241/24.1 |

(Continued)

FOREIGN PATENT DOCUMENTS

| | | | | |
|---|---|---|---|---|
| CA | 2925311 A1 | | 9/2017 | |
| CN | 106000607 A | * | 10/2016 | |
| DE | 102016119856 A1 | * | 4/2018 | B02C 23/02 |

(Continued)

OTHER PUBLICATIONS www.Lippmann-Milwaukee.com, "4800 Closed Circuit Impactor Plant," Lippman Milwaukee, Date unknown but predates filing date, 2 pages.

(Continued)

*Primary Examiner* — Bobby Yeonjin Kim
*Assistant Examiner* — Paul Derek Pressley
(74) *Attorney, Agent, or Firm* — Todd R. Fronek; Larkin Hoffman Daly & Lindgren, Ltd.

(57) ABSTRACT

Systems, methods and apparatus are provided for crushing aggregate material. In some embodiments, in an operating configuration a recirculating conveyor deposits material previously crushed by a crusher into the feed inlet of the crusher. In some embodiments, the recirculating conveyor is pivoted inward about a vertical axis into the operating configuration.

11 Claims, 4 Drawing Sheets

(56) References Cited

U.S. PATENT DOCUMENTS

| | | | | |
|---|---|---|---|---|
| 2021/0299674 | A1 * | 9/2021 | Narayanaswamy | B02C 21/02 |

FOREIGN PATENT DOCUMENTS

| | | | | | |
|---|---|---|---|---|---|
| EP | 2883624 | A1 * | 6/2015 | | B02C 21/026 |
| EP | 3144069 | A1 | 3/2017 | | |
| EP | 2921234 | B1 | 5/2018 | | |
| EP | 3645168 | B1 | 5/2020 | | |
| EP | 2756887 | B1 | 6/2020 | | |
| WO | WO-2020021467 | A1 * | 1/2020 | | B02C 21/02 |

OTHER PUBLICATIONS

Www.EagleCrusher.com, “UltraMax 1200-CC Closed Circuit Portable Impactor Plant,” Eagle Crusher, Jul. 2018, 2 pages.

www.inertiamac.com, “4048 Pegasus,” Inertia Machine Corporation, Date unknown but predates filing date, 2 pages.

No Author, “Portable Plants,” Kolberg-Pioneer, Inc., Johnson Crushers International, Inc. and Astec Mobile Screens, Inc., Nov. 2018, 20 pages.

Irockcrushers.com, “Portable Horizontal Shaft Impact Crusher (HSI) RDS-20,” IRock, Date unknown but predates filing date, 2 pages.

Terex MPS, “CRH1113R field video2,” Apr. 2020[retrieved on Jul. 28, 2023], retrieved from URL <https://www.youtube.com/watch?v=Z2G0dPTDHgU>, 2 pages.

* cited by examiner

RECIRCULATING CRUSHING PLANT

BACKGROUND

Crushing plants include crushers for crushing material such as aggregate material. Some crushing plants include recirculating conveyors.

DESCRIPTION

Figure 1:
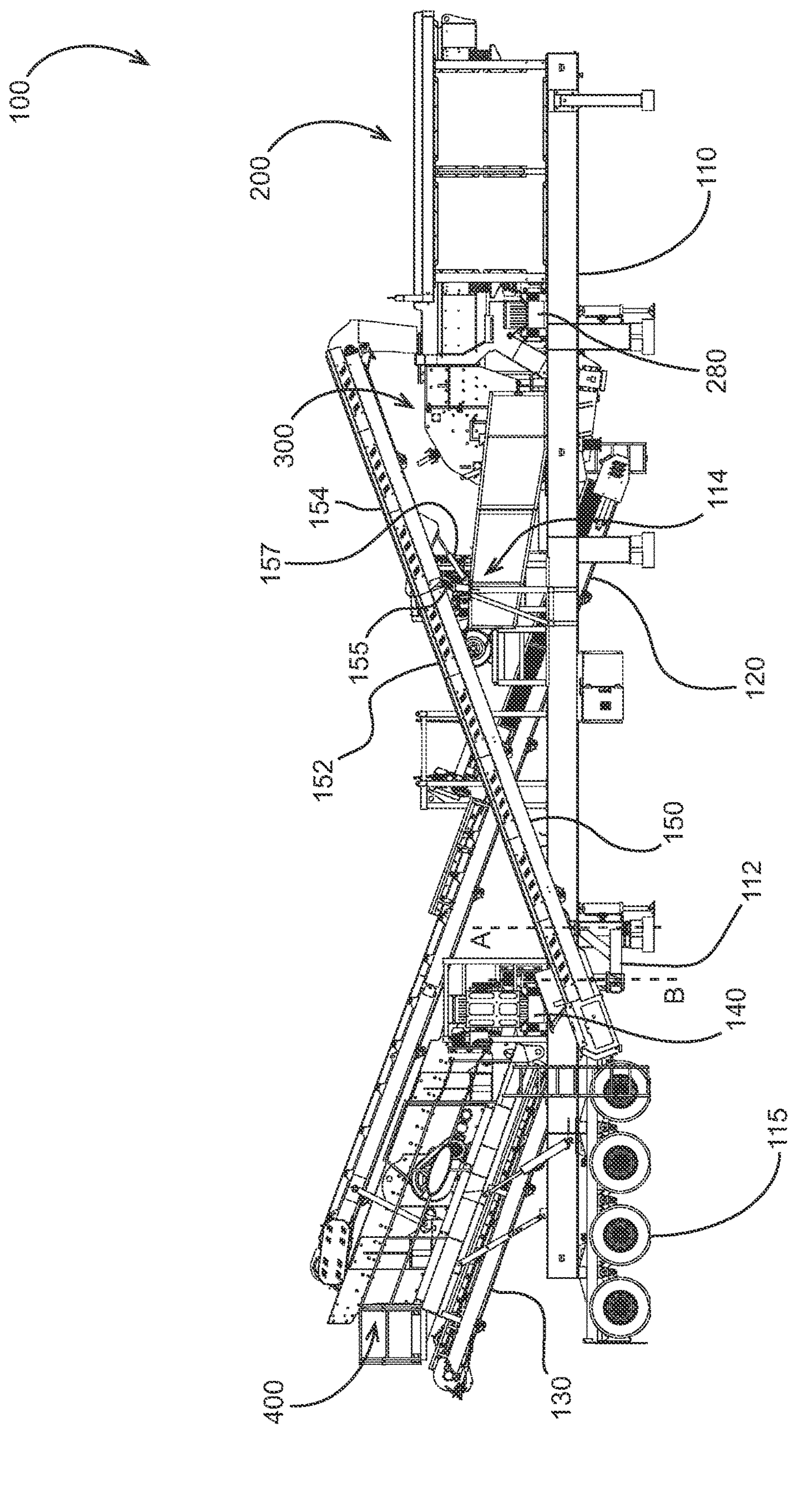
FIG. 1 is a side elevation view of an embodiment of a recirculating crushing plant.
Figure 2:
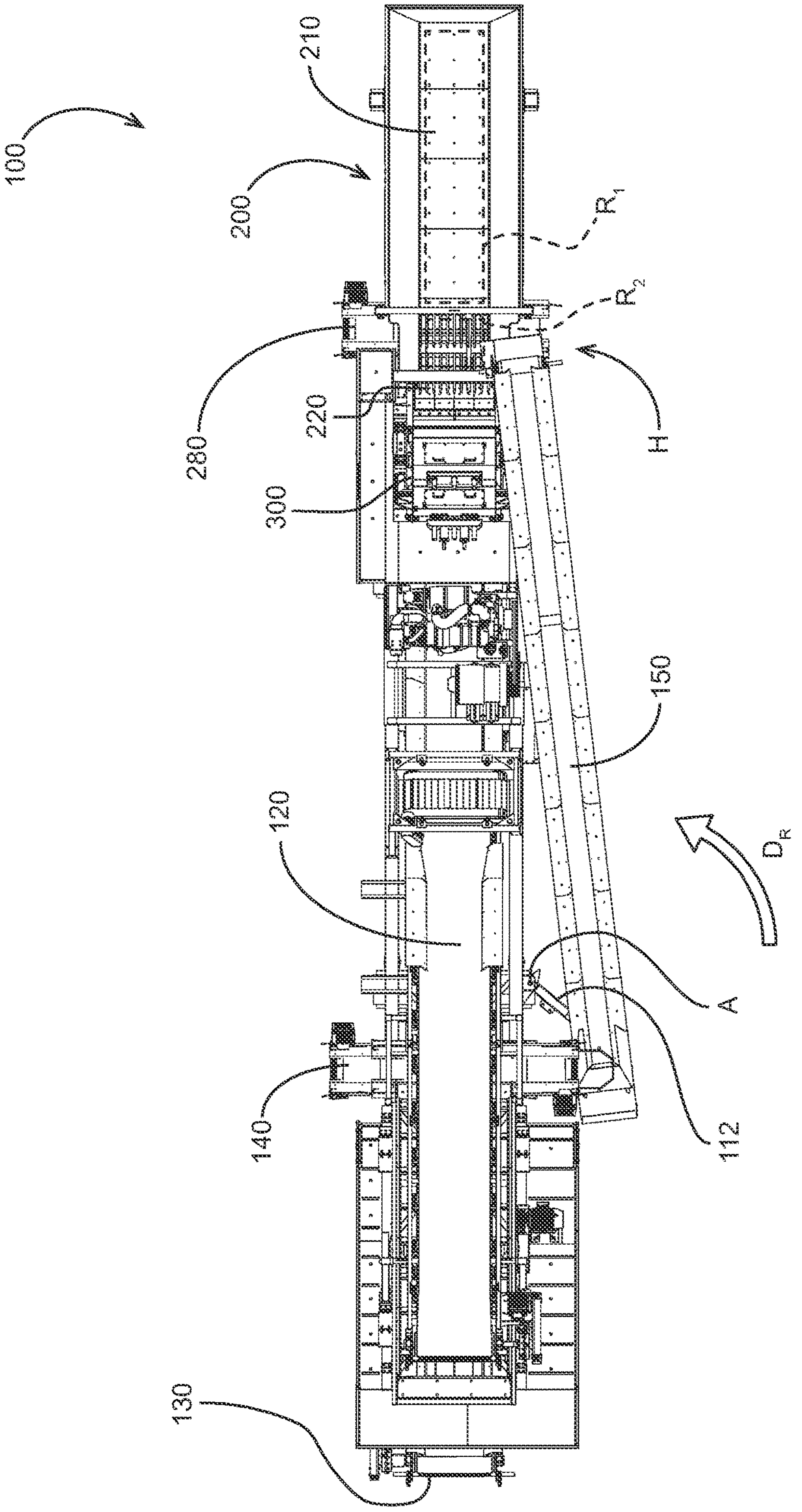
FIG. 2 is a top view of the recirculating crushing plant of FIG. 1.

Referring to the drawings, wherein like reference numerals designate identical or corresponding parts throughout the several views, FIGS. 1 and 2 illustrate a recirculating crushing plant 100 including a chassis 110 which is optionally portable or mobile (e.g., on wheels 115, powered tracks, non-powered tracks, etc.). A vibratory feeder 210 (e.g., a grizzly feeder having an array of grizzly bars 220) is optionally supported on the chassis 110. The feeder 210 optionally receives a feed of material onto a region $R_1$. Vibration of the feeder 210 optionally moves the feed of material to a region $R_2$ where the material is optionally classified, with undersized material falling onto a cross-conveyor 280 for conveying away from the plant 100. The feeder 210 optionally deposits oversized material (either directly or via an intermediate conveyor or feeder) into a crusher such as a horizontal shaft impact crusher 300 (or in other embodiments another crusher such as a vertical shaft impact crusher, cone crusher, jaw crusher, etc.). The crushed output of crusher 300 is optionally deposited (either directly or via an intermediate conveyor or feeder) onto a conveyor 120.

Conveyor 120 optionally deposits material onto a vibratory classifier 400 (e.g., multi-deck incline screen, multi-deck horizontal screen, etc.). A conveyor 130 is optionally disposed to receive undersize material passing through the classifier 400 for conveyance away from the plant 100. A cross-conveyor 140 is optionally disposed to convey material onto a recirculating conveyor 150.

Recirculating conveyor 150 optionally has a transport configuration in which the length of the conveyor 150 is generally aligned with the chassis 110 and/or the travel direction of the chassis 110. Recirculating conveyor 150 optionally has an operating configuration pivoted inboard (generally about the direction $D_R$ shown in FIG. 2) such that a head end H of conveyor 150 is disposed to deposit material onto region $R_1$ or $R_2$ of the vibratory feeder 200. In some embodiments, the conveyor 150 deposits material generally in the transverse center of the feed of material on vibratory feeder 200.

In some embodiments, conveyor 150 is at least partially supported on a distal end of a pivot arm 112 for pivoting about a generally vertical axis B. A proximal end of pivot arm 112 is optionally pivotally supported on chassis 110 for pivoting about a generally vertical axis A. The conveyor 150 is optionally supported on a support 114 (e.g., pivotal support) which also optionally permits pivoting about a vertical axis.

Pivoting of the pivot arm 112 and/or conveyor 150 permits inboard pivoting of the conveyor 150 about the direction $D_R$. One or more actuators (not shown) are optionally disposed to pivot the pivot arm 112 relative to chassis 110 and/or to pivot the conveyor 150 (e.g., by pushing a generally forward portion of the conveyor 150 in an inboard direction).

The conveyor 150 optionally has a rearward portion 152 and forward portion 154 joined at a horizontal pivot 155. An actuator 157 is optionally disposed to raise and lower the forward portion 154 (e.g., for operation and transport, respectively, and/or for positioning of head end of conveyor 150 relative to crusher 300).

Figure 3:
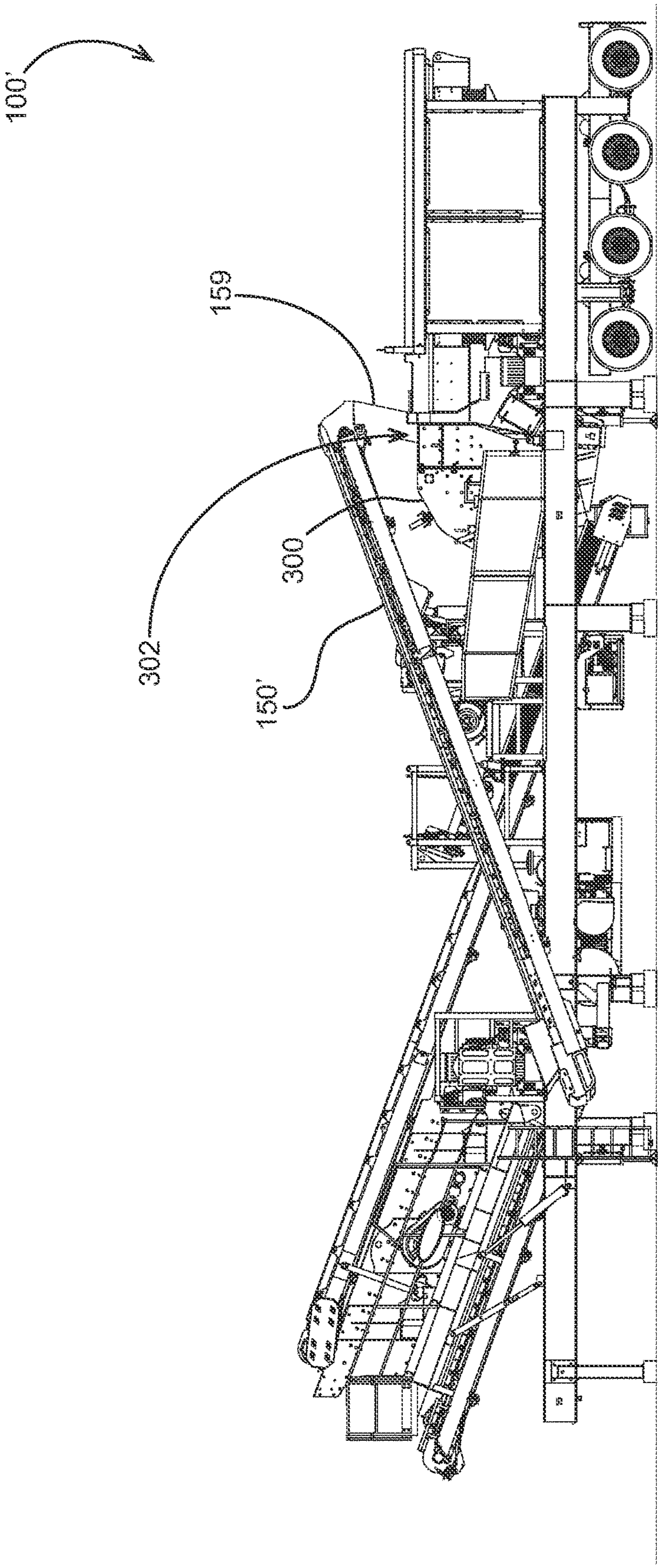
FIG. 3 is a side elevation view of another embodiment of a recirculating crushing plant.
Figure 4:
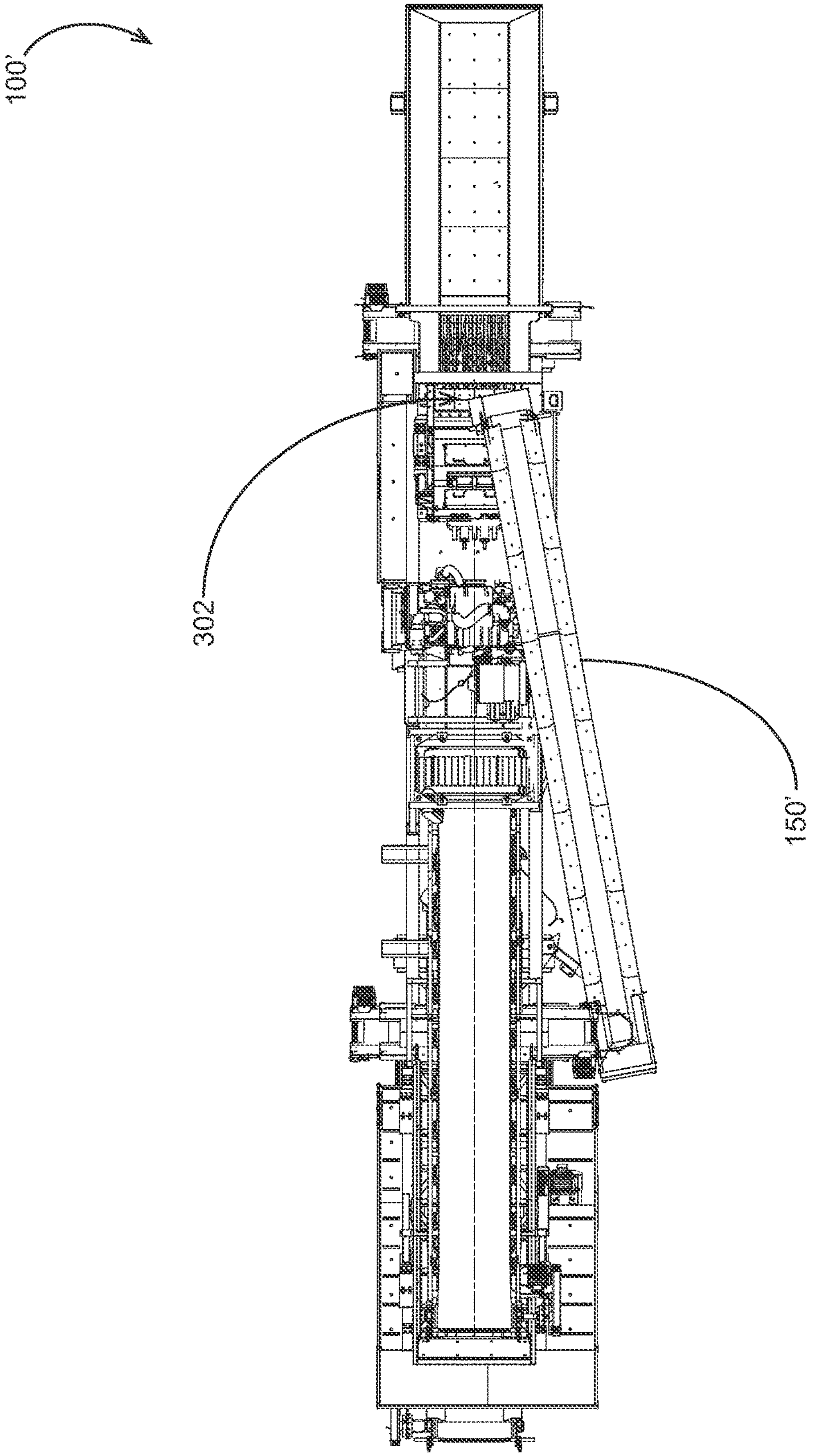
FIG. 4 is a top view of the recirculating crushing plant of FIG. 3.

Referring to FIGS. 3 and 4, another embodiment of a plant 100' is illustrated having a modified conveyor 150' configured (e.g., sized) to deposit material (e.g., directly) into a feed inlet 302 of the crusher 300 in the operational configuration of the conveyor 150'. In some embodiments, the conveyor 150' includes a chute 159 or other intermediate structure disposed at a head end of the conveyor 150 and configured to guide material to the inlet 302. In some embodiments, the conveyor 150' is configured to deposit material generally at a lateral center of the feed inlet 302 in the operational configuration of the conveyor 150'. Material entering the lateral center of the feed inlet 302 is optionally laterally centered on a blow bar rotor of the crusher 300.

In some embodiments, an intermediate structure such as a slide, chute, etc. is disposed under and optionally attached supported by the head end of conveyor 150 (or conveyor 150'). The intermediate structure is optionally configured to receive at a first deposition location from the conveyor 150, slidingly support material deposited by the conveyor 150 as the material moves downward by gravity and inboard toward a second deposition location at which the material falls from the intermediate structure. The second deposition location is optionally aligned with the lateral center of the feed inlet of the crusher along a vertical plane extending in the travel direction of the plant 100. In various embodiments, the second deposition location is located above the crusher inlet, above the feeder, etc.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A portable recirculating crushing plant, comprising:

a portable chassis;

a feeder supported on said chassis, said feeder having a discharge end;

a crusher supported on said chassis, said crusher comprising a horizontal shaft impact crusher, said crusher having an upward-facing feed inlet in an upper portion thereof to receive material deposited vertically therein, said feed inlet being separate and spaced apart from said feeder discharge end, said discharge end of said feeder being positioned to deposit material into said feed inlet of said crusher;

a vibratory classifier supported on said chassis;

a first conveyor disposed to convey material from said crusher to said vibratory classifier;

a cross-conveyor disposed to receive material from said vibratory classifier;

a pivot arm pivotally supported on said chassis for pivoting relative to said chassis about a vertical pivot axis A; and a second conveyor disposed to receive material from said cross-conveyor, said second conveyor having a head end and a tail end, said second conveyor having a length, said second conveyor having a chute supported thereon, said chute being disposed to receive material deposited from said cross-conveyor, said chute having a chute outlet, said second conveyor having a transport configuration and an operating configuration, said second conveyor being pivotably supported on said pivot arm for pivoting relative to said pivot arm about a pivot axis B, said pivot axis B being generally parallel to said vertical pivot axis A, said pivot axis B being spaced apart from said vertical pivot axis A, whereby said second conveyor is pivotable about vertical pivot axis A and pivot axis B, said second conveyor being pivotable between said transport configuration and said operating configuration, wherein in said operating configuration, said tail end is disposed at least partly beneath and adjacent to said cross-conveyor to receive material from said cross-conveyor, wherein in said operating configuration, said second conveyor is oriented to convey material in an at least partially inboard direction, wherein in said operating configuration, said length of said second conveyor is such that said chute is disposed to guide material directly into said feed inlet without contacting said feeder, wherein in said transport configuration, said tail end is closer to said chassis than in said operating configuration, and wherein in said transport configuration, said head end is disposed outboard of said crusher, wherein said crusher is disposed such that second conveyor is able to pivot into said operating position with said head end above said crusher without interfering with said crusher.

2. The portable recirculating crushing plant of claim 1, wherein said horizontal shaft impact crusher comprises a blow bar rotor, wherein in said operating configuration said second conveyor is disposed to deposit material onto a lateral center of said blow bar rotor.

3. The portable recirculating crushing plant of claim 1, wherein said second conveyor comprises a chute, said chute being disposed to deposit the material into said feed inlet.

4. The portable recirculating crushing plant of claim 1, further comprising:

a vibrating feeder supported on said chassis, wherein said crusher is disposed to receive material from said vibrating feeder.

5. The portable recirculating crushing plant of claim 1, wherein said second conveyor is configured to deposit material at a lateral center of said feed inlet in the operational configuration of said second conveyor with said tail end being offset from said lateral center.

6. The portable recirculating crushing plant of claim 1, wherein said crusher comprises a blow bar rotor, wherein said second conveyor is configured to deposit material at a lateral center of said blow bar rotor with said tail end being offset from said lateral center.

7. The portable recirculating crushing plant of claim 1, further comprising a horizontal pivot along said second conveyor between said head end and said tail end, said horizontal pivot pivotally supporting said second conveyor and constraining said second conveyor to pivot about a third horizontal axis.

8. A method of crushing material, comprising:

supporting a pivot arm on a chassis for pivoting about a first vertical axis A;

supporting a return conveyor on said pivot arm for pivoting said return conveyor about a second axis B generally parallel to said first vertical axis A;

repositioning a tail end of said return conveyor from a relatively inboard transport configuration to a relatively outboard position by pivoting said return conveyor about said first vertical axis A and said second axis B;

pivoting a head end of said return conveyor to an operational configuration in which said head end of said return conveyor is at least partially disposed above a horizontal impact crusher, said pivoting movement being carried out without interfering with said horizontal impact crusher;

depositing a feed of material from a discharge end of a vibratory feeder;

with said horizontal impact crusher, said horizontal shaft impact crusher having a feed inlet separate from said vibratory feeder, receiving said feed of material in said feed inlet and crushing material from said feed of material;

conveying material from said horizontal impact crusher to a vibratory classifier;

classifying material from said horizontal impact crusher to create a first subset of classified material and a second subset of classified material;

by a cross-conveyor, depositing said first subset of classified material to said return conveyor;

by said return conveyor in said operational configuration, conveying said first subset of classified material in an at least partially inboard direction; and by said return conveyor in said operational configuration, conveying said first subset of classified material along a return conveyor length and depositing said first subset of classified material directly into said feed inlet of said horizontal shaft impact crusher without said first subset of classified material contacting said vibratory feeder, wherein said return conveyor is disposed such that said return conveyor length is configured such that in said operational configuration, at least one of a head end or chute of said return conveyor is disposed directly above said feed inlet and not directly above said vibratory feeder.

9. The method of claim 8, wherein said step of crushing material comprises impacting material against a plurality of surfaces by a blow bar rotor.

10. The method of claim 9, wherein said step of conveying material from said crusher to a vibratory classifier comprises centering said feed of material on said blow bar rotor with said tail end being off-center from said blow bar rotor.

11. The method of claim 8, further comprising:

constraining said return conveyor to pivot about a third pivot axis disposed between said tail end and said head end of said return conveyor.

* * * * *